US008606905B1

(12) United States Patent  
Martin et al.

(10) Patent No.: US 8,606,905 B1
(45) Date of Patent: Dec. 10, 2013

(54) AUTOMATED DETERMINATION OF SYSTEM SCALABILITY AND SCALABILITY CONSTRAINT FACTORS

(75) Inventors: Justin A. Martin, Olathe, KS (US); Margaret M. McMahon, Kansas City, MO (US); Brian J. Washburn, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 598 days.

(21) Appl. No.: 12/900,154

(22) Filed: Oct. 7, 2010

(51) Int. Cl.
*G06F 15/173* (2006.01)
(52) U.S. Cl.
USPC .......................................... 709/224; 709/225
(58) Field of Classification Search
USPC ................................................. 709/224, 225
See application file for complete search history.

(56) References Cited

U.S. PATENT DOCUMENTS

| | | | | |
|---|---|---|---|---|
| 6,393,480 | B1 * | 5/2002 | Qin et al. | 709/224 |
| 6,820,042 | B1 * | 11/2004 | Cohen et al. | 703/2 |
| 7,197,428 | B1 | 3/2007 | Saghier et al. | |
| 7,243,049 | B1 | 7/2007 | Saghier et al. | |
| 7,296,256 | B2 * | 11/2007 | Liu et al. | 717/104 |
| 7,369,967 | B1 | 5/2008 | Washburn et al. | |
| 7,454,464 | B2 * | 11/2008 | Puthenkulam et al. | 709/204 |
| 7,680,916 | B2 * | 3/2010 | Barnett et al. | 709/223 |
| 7,937,473 | B2 * | 5/2011 | Nakadai | 709/226 |
| 7,962,916 | B2 * | 6/2011 | Ramanathan | 718/105 |
| 8,005,644 | B1 | 8/2011 | Evans et al. | |
| 8,069,240 | B1 * | 11/2011 | Ybarra, III | 709/224 |
| 8,296,424 | B2 * | 10/2012 | Malloy et al. | 709/224 |
| 2006/0085541 | A1 * | 4/2006 | Cuomo et al. | 709/224 |
| 2007/0168494 | A1 * | 7/2007 | Liu et al. | 709/224 |
| 2009/0157870 | A1 * | 6/2009 | Nakadai | 709/224 |

OTHER PUBLICATIONS

Martin, Justin A., et al., Patent Application entitled "Server Maintenance Modeling in Cloud Computing", filed Dec. 24, 2011, U.S. Appl. No. 13/326,184.

* cited by examiner

*Primary Examiner* — Duyen Doan

(57) ABSTRACT

A system is provided comprising processor, memory, and application that captures production server metrics, and accesses an analytical model modeling response times and system utilization. The system enters a configuration into the model simulating the production environment and comprises a load and growth factor, generates modeled response times, calculates throughput rates, and determines a baseline production load. The system combines throughput rates and response times with the baseline production to project future throughput rates and response times. The system identifies at least one production server load metric associated with at least one of a projected future throughput rate and response time approaching a constant and executes a work order for a hardware or software change in the production environment based on at least one observed production server load metric associated with at the least one of a projected future throughput rate and a projected future response time approaching a constant.

20 Claims, 4 Drawing Sheets

AUTOMATED DETERMINATION OF SYSTEM SCALABILITY AND SCALABILITY CONSTRAINT FACTORS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Server resources may be defined in a plurality of manners. Definitions may be limited to hardware descriptions or may be expanded to include firmware, operating systems, middleware, application software, and network components. Hardware may comprise central computing components consisting of processors, memory, and input/output components. Attached storage capacity, disk controllers, network adapters, display capabilities, power supplies, failover and redundancy hardware, heat management hardware, and physical form factor may comprise additional defining factors. Server hardware may depend on the function of the server, for example file server, print server, web server, or database server. Server resources also may comprise firmware, referred to in computing as basic input/output systems (BIOS), that comprise nonvolatile programs and data structures that internally control various electronic functions of a server. Server resource definitions may be expanded further to include embedded operating systems and software operating systems that provide the ability to reconfigure and update both hardware and software without restart, provide backup facilities, and provide flexible and advanced networking capabilities.

SUMMARY

In an embodiment, a system for modeling server resource usage is provided. The system comprises a processor, a memory, and a modeling application stored in the memory that, when executed by the processor, captures a plurality of production server metrics associated with a first enterprise application executing in a production environment. The system also accesses an analytical model wherein the analytical model models response times and system utilization associated with a plurality of modeled server configurations under a plurality of processing load scenarios. The system also enters a first modeled configuration into the analytical model wherein the first modeled configuration simulates the production environment and comprises a modeled baseline server load and a server load growth factor. The system also generates from the analytical model a plurality of modeled response times associated with processing of a plurality of modeled server loads comprising the modeled baseline server load and server loads based on the server load growth factor. The system also calculates an index of derived throughput rates from the plurality of modeled response times and the plurality of modeled server loads, wherein a derived throughput rate associated with the modeled baseline server load is designated as the basis of the index and wherein throughput rates associated with server loads based on the server load growth factor increment from the basis. The system also determines a baseline production server load metric from the plurality of production server metrics. The system also combines the index of derived throughput rates and the modeled response times with the baseline production server load metric to project future throughput rates and future response times associated with the baseline production server load metric and production server load metrics based on the server load growth factor. The system also identifies at least one production server load metric associated with at least one of a projected future throughput rate and a projected future response time approaching a constant. The system also creates a work order for at least one of a hardware change and a software change in the production environment based on at the least one observed production server load metric associated with the at least one of a projected future throughput rate and a projected future response time approaching a constant.

In an embodiment, a processor-implemented method of modeling server resource usage is provided. The method comprises a modeling server combining indices of derived throughput rates and corresponding sets of modeled response times with baseline production server load metrics to project future throughput rates and future response times associated with the baseline production server load metrics and production server load metrics based on a plurality of server load growth factors associated with a first production configuration. The method also comprises the modeling server generating a first growth scenario based on a first server load growth factor and generating a second growth scenario based on a second server load growth factor wherein the first load growth factor is greater than the second load growth factor. The method also comprises the modeling server projecting a first throughput rate at the end of a predetermined time period for the first growth scenario and projecting a second throughput rate at the end of the predetermined time period for the second growth scenario. The method also comprises the modeling server determining that the second throughput rate meets or exceeds a minimum throughput rate and determining that the first throughput rate is less than the minimum throughput rate. The method also comprises the modeling server determining that throughput rates in excess of the second throughput rate are associated with scalability problems in the first production configuration. The method also comprises the modeling server allocating a work order for increased processing capacity in the first production configuration.

In an embodiment, a processor-implemented method of modeling server resource usage is provided. The method comprises a modeling server accessing an analytical model that models response time performance of a plurality of modeled server configurations under a plurality of processing load scenarios. The method also comprises the modeling server generating a first plurality of modeled response times from the analytical model based on a first modeled server configuration under a first processing load scenario. The method also comprises the modeling server generating a second plurality of modeled response times from the analytical model based on a second modeled server configuration under the first processing load scenario. The method also comprises the modeling server promoting a third server modeled configuration based on an analysis of the first plurality of modeled response times and the second plurality of modeled response times, wherein the third modeled server configuration combines elements of the first modeled server configuration and the second modeled server configuration. The method also comprises the modeling server generating a third plurality of modeled response times from the analytical model based on the third modeled server configuration under the first processing load scenario. The method also comprises the modeling server creating a work order for a server configuration matching the third modeled server configuration based on a determination that the third plurality of modeled response times indicates that the third modeled server configuration promotes improved performance relative to the first modeled server configuration and the second modeled server configuration.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
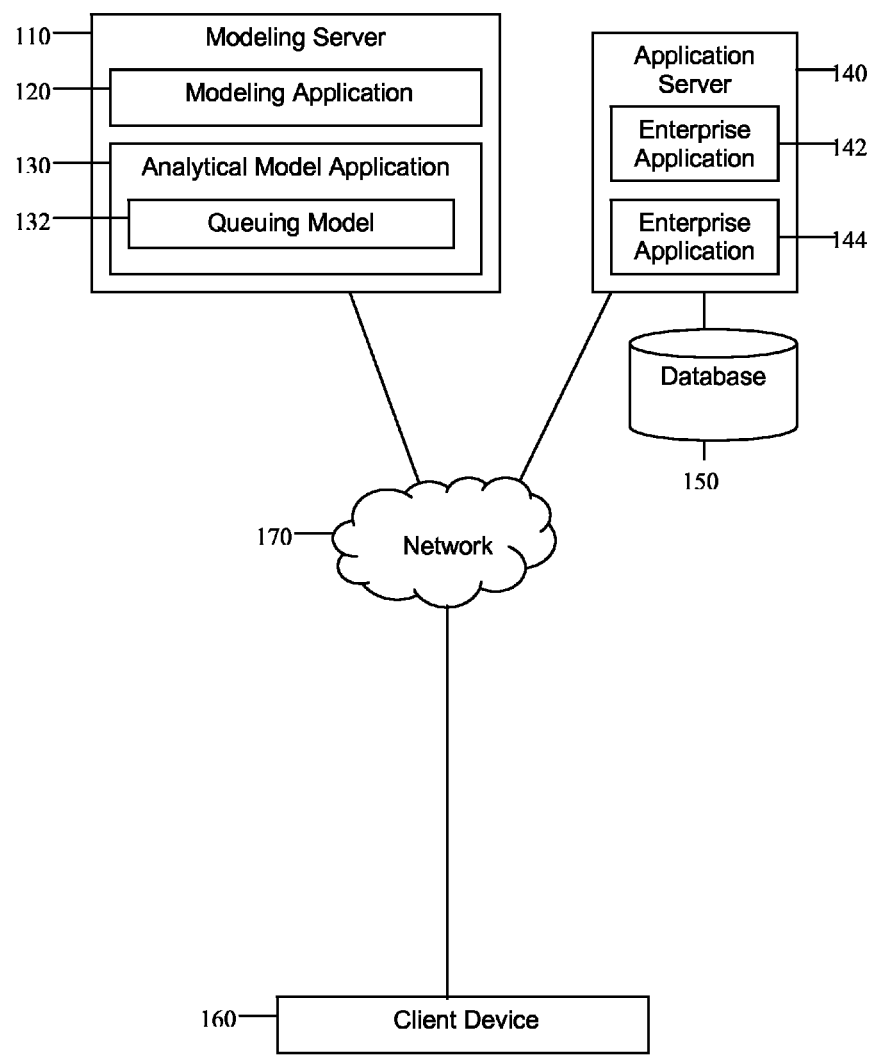
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure provides a system and methods that combine an analytical model of server resource availability with actual production data regarding application throughput to project future throughput statistics and to identify potential scalability issues. Based on the analytical model, the system determines a baseline response rate corresponding to an entered baseline server processing load and derives a baseline throughput rate. Based on increases to the baseline server load, the system determines changes in response rates from the baseline response rate and determines changes in derived throughput rates from the derived baseline throughput rate. The system may create an index or schedule of derived throughput rates that uses the derived baseline throughput rate as the basis or starting point and increments changes to the baseline throughput rate from the basis. The index of throughput rates and modeled response rates may be combined with actual production server load data to identify server loads with projected throughput rates and response times that may not be satisfactory. These results may be analyzed with additional system utilization data produced by the analytical model. Scalability issues may be identified and hardware and software changes may be made in the production environment to circumvent anticipated problems.

Scalability as used herein may refer to whether a server application executing on a production system is able to process increasing amounts of load while still providing a minimum acceptable throughput rate and/or a minimum acceptable response time. A system whose performance improves after adding hardware, proportional to the capacity added, may be described as scalable. A system whose performance maintains acceptable or improved throughput results while maintaining similar response time or a minimal increase in response time after adding hardware and being subjected to escalating processing loads also may be considered scalable. Alternative uses of the term scalability may comprise more commercially oriented definitions, such as the capacity of a computer to economically accommodate the installation of more hardware or where the scalability of a company implies that the underlying business model offers the potential for economic growth within the company. While these alternative uses may be useful in some contexts, scalability in the present disclosure refers to the ability of a production system hosting an enterprise application to handle growth in processing load while still providing a minimum throughput rate and/or a maximum response time.

The system enters a predetermined server configuration, including processor capacity, memory capacity, and input/output capacity, into the analytical model. A queuing model associated with the analytical model processes a stream of input associated with the modeled baseline server load entered into the analytical model and generates modeled response times for the input based on input growth scenarios. The analytical model additionally produces system metrics about server resource usage associated with levels of input processing volume. The system derives the throughput baseline from the baseline response time and modeled baseline server load. The system derives other throughput rates in addition to the baseline throughput rate using the baseline response time and additional modeled response times associated with modeled server load growth. The system may calculate the index of derived throughput rates that comprises a series of numeric factors associated with changes in derived throughput as modeled server loads are subjected to growth factors.

The system then selects a server load baseline from production data and processes this information, the modeled response rates, and the index of derived throughput rates through at least one script or algorithm. The results comprise projections of future response times and future throughput rates for the production server based on server loads in a variety of growth scenarios. The results also comprise projections of future resource utilization corresponding to the baseline production server load and additional server loads based on growth scenarios. When projected future throughput rates, future response times, and future system utilization data exhibit leveling off or declining at some production server load levels as projected by the system taught herein, this may indicate performance bottlenecks and/or scalability issues with the modeled server configuration at those load levels. Further investigation of these potential bottlenecks and scalability issues may lead to hardware changes in the production environment of the enterprise application and consequent improved performance.

The analytical model described herein may be a commercially available software package that generates system metrics and performance output based on a stream of inputs handled by the queuing model associated with or contained within the analytical model. The analytical model provides modeled output, for example response times, based on modeled inputs such as server hardware information, server load levels, and load growth. The capabilities of the analytical model may not extend to handling actual enterprise application data generated in production environments. The present disclosure teaches a modeling server and modeling application that manipulate and/or process the output of the analytical model and combine the modeled output with the actual output of an enterprise application in production to simulate or project future results under various load conditions. The modeling application may combine throughput statistics derived from output of the analytical model and modeled response times generated by the analytical model with server load statistics taken from production servers. The system may observe throughput problems under some load growth scenarios that prompt an analysis of server hardware leading to identification of hardware constraints and potential hardware upgrade in the production environment. The system may promote the testing of modeled hardware changes in the analytical model and the observation of consequent improvements or degradations to response times and derived throughput levels corresponding to levels of server load. The present disclosure may promote the determinations of which production systems may scale satisfactorily with increased production load and which systems exhibit performance leveling or degradation. The causes of unsatisfactory scalability may be indicated and a remediation strategy may also be suggested by the present disclosure.

Turning now to FIG. 1, a system 100 of automated determination of system scalability and scalability constraint factors is provided. The system 100 comprises a modeling server 110, a modeling application 120, an analytical model application 130, a queuing model 132, an application server 140, enterprise applications 142, 144, a database 150, a client device 160, and a network 170.

The modeling server 110 is a computer system. Computer systems are described in detail hereinafter. The modeling application 120 executes on the modeling server 110 and processes modeled response times and derived throughput rates for a modeled server configuration under a plurality of load conditions with load statistics generated by the enterprise applications 142, 144 in a production environment that the modeled server configuration may resemble. The modeling application 120 processes the output of the analytical model application 130 comprising response times modeled under a predetermined set of server load and the derived throughput rates with production server loads to project associations of server load and hardware conditions that may indicate scalability problems. While the analytical model application 130 is depicted in FIG. 1 as executing on the modeling server 110, in an embodiment the analytical model application 130 may execute on another computer system.

The modeling application 120 determines a modeled baseline response time from the response times generated by the analytical model application 130. The modeled baseline response time may be the response time associated with the baseline server load entered into the analytical model application 130. The modeling application 120 derives a baseline throughput rate from the baseline response time and also derives additional throughput rates from the modeled response times. The modeling application 120 may create an index or schedule of derived throughput rates using the derived baseline throughput rate as a basis or starting point. The additional throughput rates derived from the modeled response times then would be indexed or incremented from the derived baseline throughput rate. The index of derived throughput rates may be specific to a modeled server configuration, a modeled baseline server load, a growth scenario or factor, and response times generated by the analytical model application 130.

The modeling application 120 establishes that given a population of modeled response rates for a modeled server build, modeled baseline server load, and growth scenario, a corresponding baseline throughput level may be determined. Additional throughput levels associated with corresponding response rates may be determined and arranged in an indexed fashion as described. Once the population of modeled response rates is produced and corresponding throughput rates are derived, the modeling application 120 then selects a baseline server load from actual production data associated with the enterprise application 142. The baseline server load from the actual production data may resemble the server load level entered into the analytical model application 130 to generate the modeled response rates. Using the production baseline server load, response rates generated from the analytical model application 130, and the derived index of throughput rates, the modeling application 120 projects future throughput rates, future response times, and future server utilization statistics for the application server 140 and the enterprise application 142 at the baseline production server load and at higher load levels. In some contexts projected future metrics, projected future throughput rates, projected future response times, and projected future server utilization statistics may be referred to as projected actual metrics, projected actual throughput rates, projected actual response times, and projected actual server utilization statistics.

The higher production load levels may be determined using the growth rates used earlier by the analytical model application 130 to determine response rates and to derive the index of throughput rates. The modeling application 120 may project trends in which a particular production server load may be processed at a slower throughput rate than expected. The modeling application 120, for a succession of increasing server loads, also may project a leveling or declining trend of throughput levels, response times, or system utilization metrics. This output may indicate that the server configuration used by the analytical model application 130 to generate the response times may have scalability issues that the actual production environment, which the server configuration may simulate in the analytical model application 130, might eventually begin to experience.

The present disclosure teaches the use of the analytical model application 130 to simulate a plurality of server configurations that may resemble production environments, including that of the application server 140 that may host the enterprise applications 142, 144. The analytical model application 130 may be a commercially available software package that simulates various configurations of processor, memory, and input/output capacity as well as configurations of other hardware elements of a contemplated or actual production server build. While the analytical model application 130 may be provided by a third party as commercial-off-the-shelf software and its functionality as provided may be accessed by the modeling server 110, in an embodiment an application programming interface (API) provided by the analytical model application 130 may be made available and the functionality of the analytical model application 130 may be altered, customized, and enhanced to suit the needs of the modeling server 110. The present disclosure teaches the modification and adaptation of the analytical model application 130 in some embodiments to support the functionality of the modeling server 110. For example, a plurality of queues may be cascaded or coupled in series. For example, queue modeling parameters may be configured to define gains, rates, queue depths, processing constraints, and other parameters.

The analytical model application 130 also incorporates the queuing model 132 for processing inputs of an application, for example the enterprise applications 142, 144. The queuing model 132 used by the analytical model application 130 may be the M/M/1 queuing model in which inputs are received and processed using exponential distributions. The analytical model application 130 may use another queuing model 132. The settings of the analytical model application 130 may be manipulated and adjusted at the election of the user to provide a more accurate representation of a contemplated or actual production environment in which the enterprise applications 142, 144 may execute.

While the analytical model application 130 may process a modeled stream of input and generate response times, system metrics and other information based on a modeled server configuration and load scenario, the analytical model application 130 does not process actual production application data generated by the enterprise application 142 in production. The present disclosure teaches the capturing of performance data produced by the enterprise application 142 and the storage of the data in the database 150 for later analysis. Production data stored in the database 150 may not be accessed and processed by the modeling server 110 until the analytical model application 130 has modeled response times under at least one modeled server load and growth scenario and an index of derived throughput rates has been produced by the modeling application 120.

The enterprise application 142, for example, may be a customer service application used by a telecommunications service provider. The enterprise application 142 may process customer inquiries or service requests and the captured and stored data may comprise throughput or response time measurements of how the enterprise application 142 executed the inquiries or requests. Throughput data derived from response rates modeled by the analytical model may be analyzed and used by the modeling application 120 as described herein. The analysis of the throughput data may include developing projections about the growth in usage of the enterprise application 142 and the potential need to add to the processing resources of the application server 140 that hosts the enterprise application 142.

The performance of the application server 140 in hosting the enterprise application 142 and its ability to achieve acceptable throughput rates under various load growth scenarios may be a focal point of users of the components of the system 100 and the teachings herein. If the application server 140 and the enterprise application 142 do not scale as expected under various load scenarios, it may be useful to determine the causes of the scalability constraint. The analytical model application 130 may be used to simulate the actions of hardware components of the application server 140 and the queuing model 132 may process inputs in a manner similar to the processing of the enterprise application 142. Since the analytical model application 130 may simulate the application server 140 and other environments, it is possible to make changes to components of the modeled hardware configuration of the analytical model application 130, process modeled server loads additional times, and observe the effects of the modeled component changes. When potential scalability issues are observed, by making a plurality of individual or combined hardware changes and generating new response times, it may be possible to identify the source of a processing bottleneck or constraint and upgrade the component, reconfigure or re-architect the system, or make other changes.

The capabilities of the analytical model application 130 may be limited to providing response times and utilization data about processors, memory, input/output, and other hardware components of the modeled server. In an embodiment, a user of the components of the system 100 may be more directly interested in how the modeled server, that may be modeled to simulate the application server 140 in production, handles processing load placed on it by a specific application, for example the enterprise application 142. While hardware component utilization data for a modeled server by itself may be instructive, the present disclosure teaches the combination of production application data from the enterprise application 142 with modeled response times and derived throughput levels from the analytical model application 130. By deriving an index of throughput rates from the modeled response times and combining the derived throughput rates and modeled response times with a baseline production server load and growth rate, the modeling application 120 may project instances where growth in server load results in slowing or declining throughput. Analyzing these results may prompt experimentation with hardware components in the analytical model application 130, for example boosting processor capacity. After the process described herein is undertaken again with at least one changed hardware component, the results may be analyzed again and further changes made to the modeled server configuration in the analytical model application 130.

The modeling server 110 may provide to the analytical model application 130 a series of inputs that comprise a server processing load. The analytical model application 130 is provided a modeled server configuration with which to process the load. The modeled server configuration may comprise specifications of at least one processor, a quantity of memory, and an input/output specification and may simulate the architecture of the application server 140. Server processing load may be expressed in a plurality of manners, for example a number of concurrent users or stations, a number of application transactions initiated, a number of invocations of an application programming interface, a number of accesses or "hits" to a web server, or a number of scripts executing on a server against a database. The server processing load may be quantified per unit time, for example load per one minute time interval, per ten minute time interval, per hour time interval, per day, per week, or another time unit effective for quantifying and/or analyzing processing load. Based on a given server processing load and a given server configuration, the analytical model application 130 may yield a response time. The server load provided may be a baseline or starting point server load. A server load growth factor also may be provided to the analytical model application 130. The growth factor may be one of about 1%, about 5%, about 10%, about 25%, or another amount.

The present disclosure may observe a convention that server processing load in a modeled system is equivalent to the product of response time and throughput rate. The convention may be similar to a convention used in retail applications wherein the long-term average number of customers in a stable system is equivalent to the long-term average arrival rate multiplied by the long-term average time a customer spends in the system. In the system 100, server processing load is a known quantity and response time is determined and yielded by the analytical model application 130. Because server processing load may be expressed in an equation as the product of response time and throughput rate and because server processing load may be known, once response time for a given server processing load has been provided by the analytical model application 130, corresponding throughput time may be determined. Throughput rate may be determined by dividing the server processing load by the response time modeled for the given server processing load.

The present disclosure teaches that for a given server configuration and a given server processing load entered into the analytical model application 130, a response time is modeled by the analytical model application 130, and a corresponding throughput rate may be calculated using the convention described above. Therefore, for a modeled series of server processing loads entered into the analytical model application 130, a corresponding series of response times may be determined and a corresponding series of throughput rates may be derived. The modeling application 120 determines a baseline response time from the population of response times generated from the analytical model application 130. The baseline response time may correspond to the modeled server processing load considered normal or typical for the server configuration entered into the analytical model application 130. The server processing load considered normal or typical may be selected by examining a range of dates and determining the approximate processing load occurring most commonly during times of operation considered typical or average for enterprise application 142.

In an embodiment, an organization that is making use of the components of the system 100 as taught herein to model a server configuration may be doing so because it is presently operating the enterprise application 142 executing on the application server 140. The organization may wish to determine performance bottlenecks or other scalability problems in advance that may arise when server processing load reaches certain levels. The organization may wish to identify the source of bottlenecks and scalability issues and circumvent the problems by making hardware and/or software changes. The present disclosure provides the system 100 and methods that promote the organization to model a server configuration in the analytical model application 130 based on the application server 140 and the enterprise application 142 and use the analytical model application 130 to test server load scenarios. By accessing the analytical model application 130, the modeling application 120 promotes the testing of various load scenarios in a test environment simulating the production environment of the organization which may include the application server 140 and the enterprise application 142. The modeling application 120 teaches the capturing and storage of a plurality of production information, including production load data, from the enterprise application 142 and storage of the production information in the database 150. The organization may examine the production load data to determine a load that may be deemed a representative or average load. The representative load then may be used in the analytical model application 130, combined with a growth factor, to determine response times and derive an index of throughput rates.

The modeled baseline server load and the growth factor entered into the analytical model application 130 may yield the series of modeled response times with one modeled response time corresponding to the modeled baseline server load and each additional server load entered based on the growth factor. For example, if the modeled baseline server load is 1000 concurrent users and the growth factor is a compounded rate of 10% every two months and growth is being examined for the next year, the modeling application 120 will feed server loads of 1000, 1100, 1210, 1331, 1464, 1611, and 1772 concurrent users to the analytical model application 130. The analytical model application 130, using the entered server configuration for processor, memory, and input/output capacities, then models response rates associated with each of the seven server loads provided. Using the entered server loads and the corresponding modeled response time for each entered server load, a throughput rate may be determined using the convention described above for each pair or combination of entered server load and response time produced by the analytical model application 130. The index of throughput rates then may be derived from this data with one throughput rate derived for each pair of server load factor and modeled response time. The derived throughput rate corresponding to the response rate associated with the baseline server load may be described as the baseline throughput rate and be designated as the starting point or basis of the index of throughput rates. Additional throughput rates may be derived by subjecting pairs of server loads and modeled response rates to the convention described above. The additional throughput rates may be indexed or incremented from the derived baseline throughput rate or basis. The index of throughput rates comprises a schedule or listing of derived throughput rates corresponding to pairs of server loads and resulting modeled response times generated by the analytical model application 130.

The modeled response times generated by the analytical model application 130 then may be processed by the modeling application 120 with server load data from the enterprise application 142 in production in a plurality of manners. This information may be combined with the index of throughput rates in a script or algorithm that projects throughput rates and response times based on the production server load data and an assumed growth rate. The information also may be combined with various system utilization information in the script or algorithm. In an embodiment, a graph may be produced with server load, expressed as quantity of concurrent users as the independent variable and time as the dependent variable. Curves may be plotted for response time, throughput rate, and utilization. When the curve for throughput rate begins to level off or the slope of the curve begins to approach a constant, one or more server resources may be nearing exhaustion. A plurality of different graphs may be created that plot various combinations of derived throughput rates, modeled response rates, and server loads under different load growth scenarios. The trends exhibited by curves in the graphs may be interpreted to exhibit various trends in server resource utilization, for example to exhibit the approaching of a processing constraint in at least one of processor, memory, and input/output hardware. Interpretation of these trends and further modeling may lead to decisions about remedial or proactive changes in hardware or software in the application server 140 or elsewhere in the production environment. Analysis of the trends may also be used in growth planning, timing of capital investment, and in rapid redeployment of virtual resources.

Hardware limitations may be identified in a plurality of manners when examining projected throughput rates and response times. In a representation of throughput rates in a graph with concurrent users as the independent variable and time as the dependent variable as described above, throughput rates could be projected starting with a baseline throughput rate corresponding to a baseline production server load. As load is added to the baseline production server load over time, the graph may depict a curve for projected throughput rate. As load increases, the throughput rate may slow and at load levels significantly higher than the baseline, the throughput rate may begin to level off or come close to a constant. This situation may indicate a processor limitation, and the problem may be remedied by adding processing capacity to the production server. Using the same graphic depiction, in some growth scenarios when processing load exceeds a critical level, the throughput rate, instead of leveling off and approaching a constant, may begin to fall. This may indicate a different system constraint than processor and may instead point to a memory or input/output constraint. For example, as load exceeds the critical level, the further processing of service requests may clog an input/output communication bus. As more service requests are loaded onto the system, contention for the input/output communication bus may cause the throughput to drop, as bus collisions occur and transmission repeat requests increase rapidly in number. Likewise, other constraints may cause throughput to drop.

The present disclosure teaches the use of the modeling application 120 combined with the output of the analytical model application 130 in a plurality of manners to model server configurations and combine the output with a plurality of production data. The analytical model application 130 may produce its output in a plurality of formats, including formats using the extensible markup language (XML), that promote flexible processing of the output by the modeling application 120 and other components.

The database 150 is associated with the application server 140 and stores data produced by the enterprise applications 142, 144. The client device 160 may be used by an administrator, developer, engineer, manager, or other user to access the components of the system 100.

The network 170 promotes communication between the components of the system 100. The network 170 may be any communication network including a public data network (PDN), a public switched telephone network (PSTN), a private network, and/or a combination.

Figure 2:
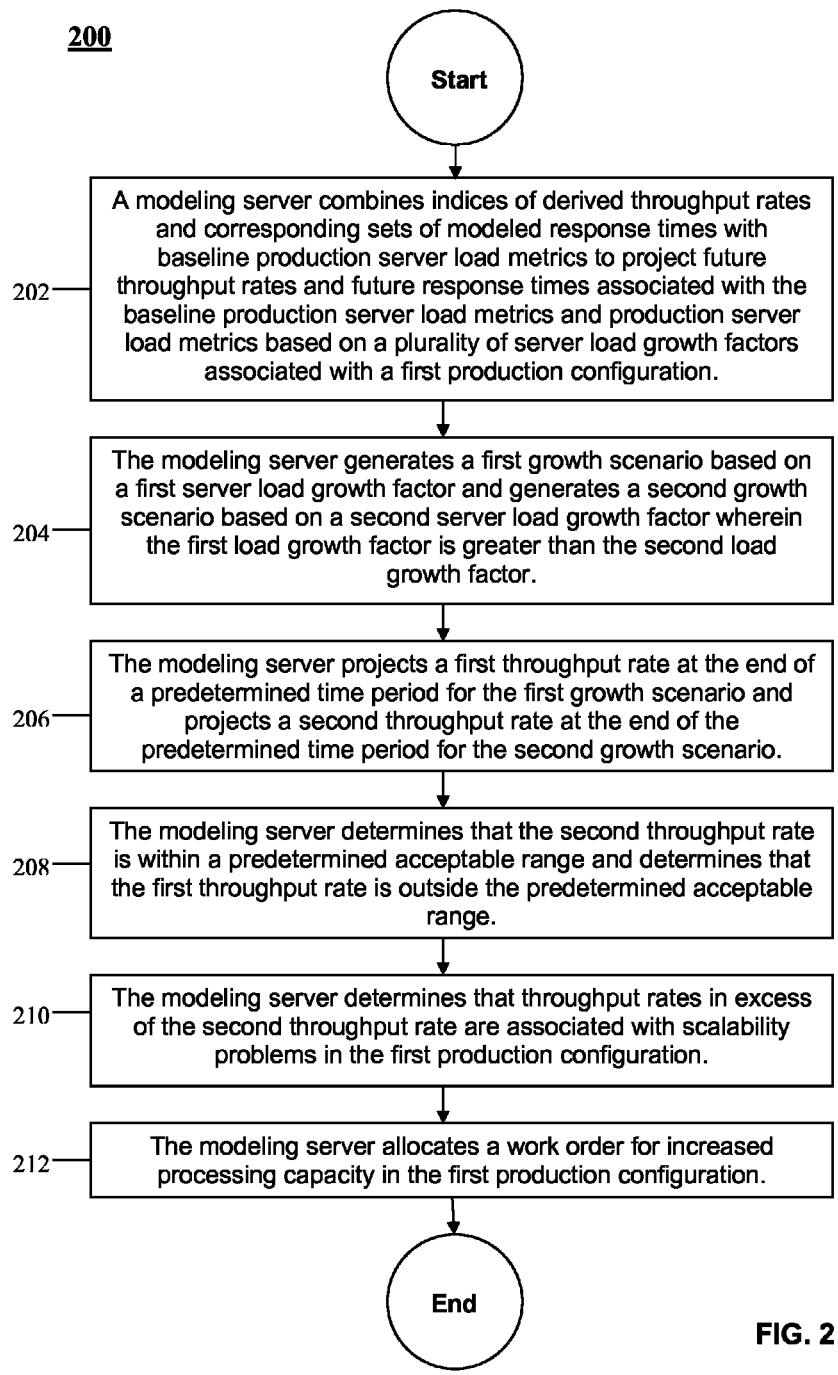
FIG. 2 is a flow chart illustrating a method according to an embodiment of the disclosure.

Turning now to FIG. 2, a processor-implemented method 200 of modeling server resource usage is provided. Beginning at block 202, a modeling server combines indices of derived throughput rates and corresponding sets of modeled response times with baseline production server load metrics to project future throughput rates and future response times associated with the baseline production server load metrics and production server load metrics based on a plurality of server load growth factors associated with a first production configuration.

At block 204, the modeling server generates a first growth scenario based on a first server load growth factor and generates a second growth scenario based on a second server load growth factor wherein the first load growth factor is greater than the second load growth factor.

At block 206, the modeling server projects a first throughput rate at the end of a predetermined time period for the first growth scenario and projects a second throughput rate at the end of the predetermined time period for the second growth scenario.

At block 208, the modeling server determines that the second throughput rate is within a predetermined acceptable range and determines that the first throughput rate is outside the predetermined acceptable range.

At block 210, the modeling server determines that throughput rates in excess of the second throughput rate are associated with scalability problems in the first production configuration.

At block 212, the modeling server allocates a work order for increased processing capacity in the first production configuration.

Figure 3:
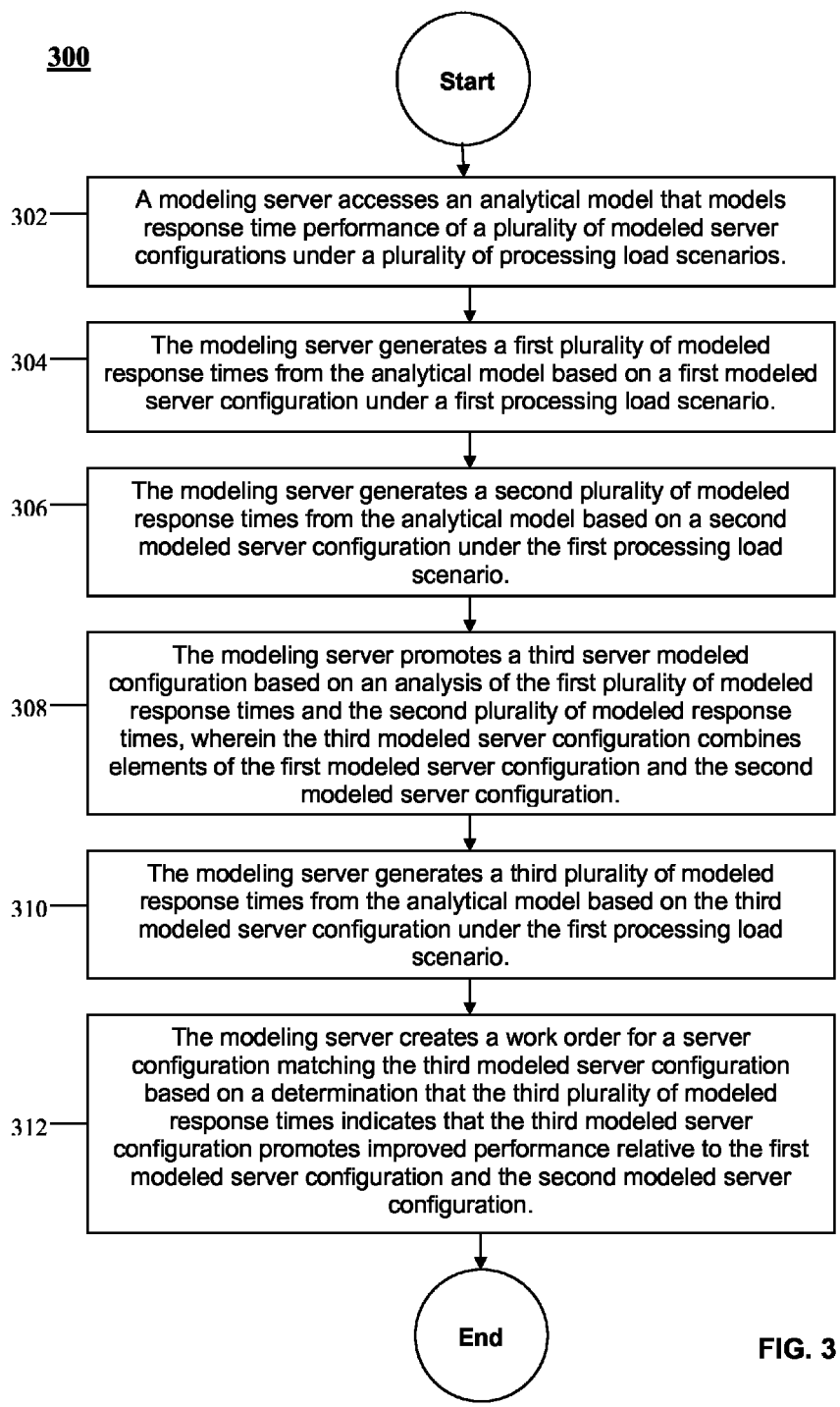
FIG. 3 is a flow chart illustrating a method according to an embodiment of the disclosure.

Turning now to FIG. 3, a processor-implemented method 300 of modeling server resource usage is provided. Beginning at block 302, a modeling server accesses an analytical model that models response time performance of a plurality of modeled server configurations under a plurality of processing load scenarios.

At block 304, the modeling server generates a first plurality of modeled response times from the analytical model based on a first modeled server configuration under a first processing load scenario.

At block 306, the modeling server generates a second plurality of modeled response times from the analytical model based on a second modeled server configuration under the first processing load scenario.

At block 308, the modeling server promotes a third server modeled configuration based on an analysis of the first plurality of modeled response times and the second plurality of modeled response times, wherein the third modeled server configuration combines elements of the first modeled server configuration and the second modeled server configuration.

At block 310, the modeling server generates a third plurality of modeled response times from the analytical model based on the third modeled server configuration under the first processing load scenario.

At block 312, the modeling server creates a work order for a server configuration matching the third modeled server configuration based on a determination that the third plurality of modeled response times indicates that the third modeled server configuration promotes improved performance relative to the first modeled server configuration and the second modeled server configuration.

Figure 4:
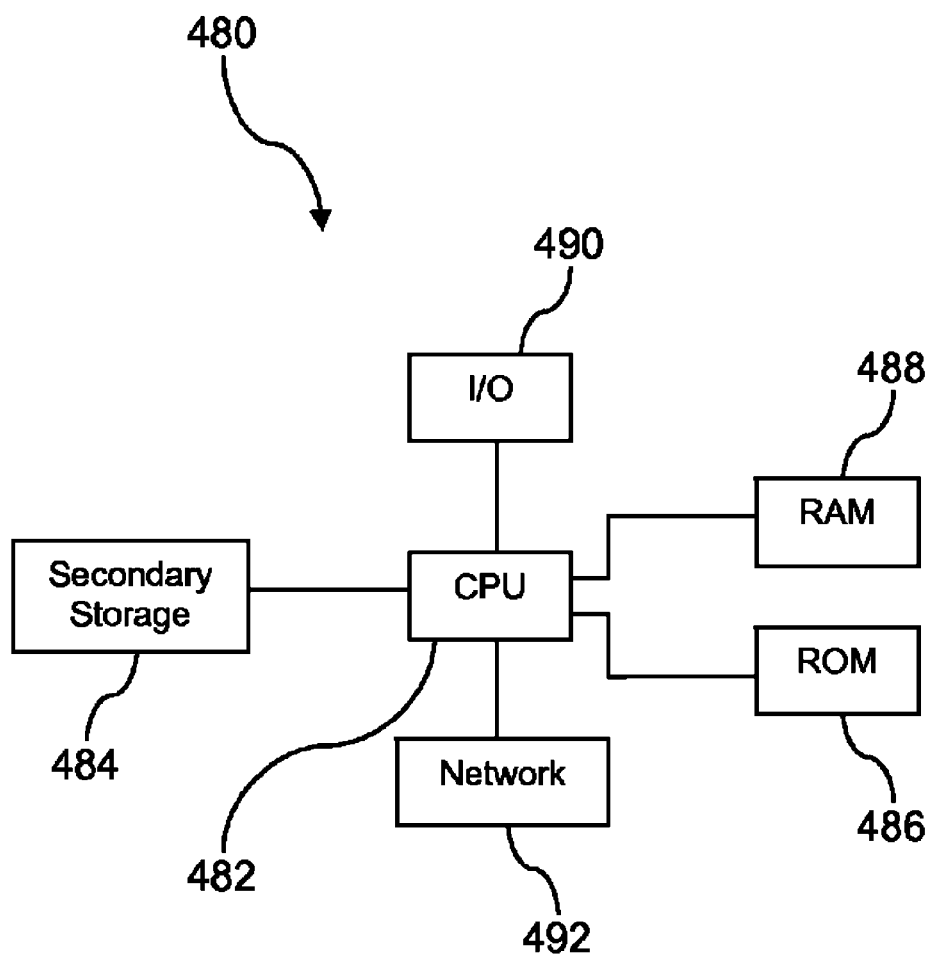
FIG. 4 illustrates an exemplary computer system suitable for implementing some aspects of the several embodiments of the disclosure.

FIG. 4 illustrates a computer system 480 suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

It is understood that by programming and/or loading executable instructions onto the computer system 480, at least one of the CPU 482, the RAM 488, and the ROM 486 are changed, transforming the computer system 480 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484. The secondary storage 484, the RAM 488, and/or the ROM 486 may be referred to in some contexts as non-transitory storage and/or non-transitory computer readable media.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 492 may enable the processor 482 to communicate with the Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 484, for example, hard drives, floppy disks, optical disks, and/or other device, the ROM 486, and/or the RAM 488 may be referred to in some contexts as non-transitory instructions and/or non-transitory information.

In an embodiment, the computer system 480 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 480 to provide the functionality of a number of servers that is not directly bound to the number of computers in the computer system 480. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 480, at least portions of the contents of the computer program product to the secondary storage 484, to the ROM 486, to the RAM 488, and/or to other non-volatile memory and volatile memory of the computer system 480. The processor 482 may process the executable instructions and/or data in part by directly accessing the computer program product, for example by reading from a CD-ROM disk inserted into a disk drive peripheral of the computer system 480. The computer program product may comprise instructions that promote the loading and/or copying of data, data structures, files, and/or executable instructions to the secondary storage 484, to the ROM 486, to the RAM 488, and/or to other non-volatile memory and volatile memory of the computer system 480.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for modeling server resource usage, comprising:
   a processor;
   a memory; and
   a modeling application stored in the memory that, when executed by the processor,
      captures a plurality of production server metrics associated with a first enterprise application executing in a production environment,
      accesses an analytical model wherein the analytical model models response times and system utilization associated with a plurality of modeled server configurations under a plurality of processing load scenarios,
      enters a first modeled configuration into the analytical model wherein the first modeled configuration simulates the production environment and comprises a modeled baseline server load and a server load growth factor,
      generates from the analytical model a plurality of modeled response times associated with processing of a plurality of modeled server loads comprising the modeled baseline server load and server loads based on the server load growth factor,
      calculates an index of derived throughput rates from the plurality of modeled response times and the plurality of modeled server loads, wherein a derived throughput rate associated with the modeled baseline server load is designated as the basis of the index and wherein throughput rates associated with server loads based on the server load growth factor increment from the basis,
      determines a baseline production server load metric from the plurality of production server metrics,
      combines the index of derived throughput rates and the modeled response times with the baseline production server load metric to project future throughput rates and future response times associated with the baseline production server load metric and production server load metrics based on the server load growth factor,
      identifies at least one production server load metric associated with at least one of a projected future throughput rate and a projected future response time approaching a constant, and
      creates a work order for at least one of a hardware change and a software change in the production environment based on at the least one observed production server load metric associated with the at least one of a projected future throughput rate and a projected future response time approaching a constant.

2. The system of claim 1, wherein the system additionally projects a future system utilization metric based on the combination of the index of derived throughput rates and the modeled response times with the baseline production server load metric.

3. The system of claim 2, wherein the system additionally identifies at least one production server load metric associated with the projected future system utilization metric indicating at least one of performance degradation and a scalability issue associated with at least one hardware component in the production environment.

4. The system of claim 3, wherein the at least one hardware component is a central processing unit (CPU), an input/output (I/O) configuration, and memory.

5. The system of claim 1, wherein the system determines a plurality of response times for the first modeled configuration based on a plurality of server load growth factors.

6. The system of claim 5, wherein the server load growth factors comprise about 1%, about 5%, about 10%, and about 25% of the modeled baseline server load.

7. The system of claim 1, wherein server load is expressed as quantity of concurrent user devices maintaining sessions with one of a server in one of the first modeled configuration and a production server.

8. The system of claim 1, wherein the modeling application observes a convention that server load is expressed as the product of throughput rate and response time.

9. A processor-implemented method of modeling server resource usage, comprising:
   a modeling server combining indices of derived throughput rates and corresponding sets of modeled response times with baseline production server load metrics to project future throughput rates and future response times associated with the baseline production server load metrics and production server load metrics based on a plurality of server load growth factors associated with a first production configuration;
   the modeling server generating a first growth scenario based on a first server load growth factor and generating a second growth scenario based on a second server load growth factor wherein the first load growth factor is greater than the second load growth factor;
   the modeling server projecting a first throughput rate at the end of a predetermined time period for the first growth scenario and projecting a second throughput rate at the end of the predetermined time period for the second growth scenario;
   the modeling server determining that the second throughput rate meets or exceeds a minimum throughput rate and determining that the first throughput rate is less than the minimum throughput rate;
   the modeling server determining that throughput rates in excess of the second throughput rate are associated with scalability problems in the first production configuration; and
   the modeling server allocating a work order for increased processing capacity in the first production configuration.

10. The method of claim 9, wherein the modeling server creates the work order based on an analysis of a statistical probability that production throughput growth will exceed the throughput level associated with the second growth scenario within a predetermined time period.

11. The method of claim 10, wherein the predetermined time period is one of one month, three months, and six months.

12. The method of claim 9, wherein the modeled throughput baseline is determined from a plurality of modeled response times based on a modeled server configuration and a plurality of load scenarios subjected to an analytical model.

13. The method of claim 9, wherein the sets of modeled response times are provided by the analytical model and the indices of derived throughput rates are generated from the sets of modeled response times.

14. The method of claim 13, wherein the sets of modeled response times are provided by the analytical model in extensible markup language (XML) format.

15. The method of claim 9, further comprising:
the modeling server generating a third growth scenario based on a third server load growth factor wherein the third load growth factor is greater than the first load growth factor;
the modeling server projecting a third throughput rate for the third growth scenario at the end of the predetermined time period determining that the third throughput rate is less than the first throughput rate; and
the modeling server allocating a work order for at least one of increased memory capacity and increased input/output capacity in the first server configuration based on the probability of the occurrence of the third growth scenario.

16. A processor-implemented method of modeling server resource usage, comprising:
a modeling server accessing an analytical model that models response time performance of a plurality of modeled server configurations under a plurality of processing load scenarios;
the modeling server generating a first plurality of modeled response times from the analytical model based on a first modeled server configuration under a first processing load scenario;
the modeling server generating a second plurality of modeled response times from the analytical model based on a second modeled server configuration under the first processing load scenario;
the modeling server promoting a third server modeled configuration based on an analysis of the first plurality of modeled response times and the second plurality of modeled response times, wherein the third modeled server configuration combines elements of the first modeled server configuration and the second modeled server configuration;
the modeling server generating a third plurality of modeled response times from the analytical model based on the third modeled server configuration under the first processing load scenario; and
the modeling server creating a work order for a server configuration matching the third modeled server configuration based on a determination that the third plurality of modeled response times indicates that the third modeled server configuration promotes improved performance relative to the first modeled server configuration and the second modeled server configuration.

17. The method of claim 16, wherein the first processing load is determined to be a representative processing load for the first enterprise application.

18. The method of claim 16, wherein the modeling server additionally analyzes the first plurality of modeled response times, the second plurality of modeled response times, and the third plurality of modeled response times based on system utilization data throughput statistics derived from the first plurality of modeled response times, the second plurality of modeled response times, and the third plurality of modeled response times.

19. The method of claim 18, wherein the modeling server combines indices of derived throughput rates and corresponding sets of modeled response times with baseline production server load metrics to project future throughput rates and future response times associated with the baseline production server load metrics and production server load metrics based on a plurality of server load growth factors.

20. The method of claim 16, wherein the first server configuration, the second server configuration, and the third server configuration comprise a plurality of combinations of central processing unit (CPU), input/output (I/O) configuration, and memory capacity.

* * * * *

UNITED STATES PATENT AND TRADEMARK OFFICE
CERTIFICATE OF CORRECTION

| | | |
|---|---|---|
| PATENT NO. | : 8,606,905 B1 | |
| APPLICATION NO. | : 12/900154 | |
| DATED | : December 10, 2013 | |
| INVENTOR(S) | : Martin et al. | |

Page 1 of 4

It is certified that error appears in the above-identified patent and that said Letters Patent is hereby corrected as shown below:

In the Claims

Claim 1, Col 15, Line 31-67 should read
captures a plurality of production server load metrics associated with an enterprise application executing in a production environment, wherein at least one of the plurality of production server load metrics is a baseline production server load metric,
determines which of the plurality of production server load metrics is the baseline production server load metric,
accesses an analytical model, wherein the analytical model models response times and system utilization associated with a plurality of modeled server configurations under a plurality of processing load scenarios,
enters a modeled configuration into the analytical model, wherein the modeled configuration simulates the production environment of the enterprise application to identify at least one production server load metric trend, wherein the at least one production server load metric trend indicates at least one of a slower than expected throughput rate, a leveling of throughput levels associated with increasing server loads, a declining of throughput levels associated with increasing server loads, a leveling of response times associated with increasing server loads, or a declining of response times associated with increasing server loads,
generates from the analytical model a plurality of modeled response times associated with a plurality of modeled server loads of the simulated production environment of the enterprise application based on a modeled baseline server load and a server load growth factor, wherein the plurality of model server loads comprises the modeled baseline server load and server loads based on the server load growth factor,
calculates an index of derived throughput rates from the plurality of modeled response times and the plurality of modeled server loads, wherein a derived throughput rate associated with the modeled baseline server load is designated as the basis of the index, and wherein throughput rates associated with server loads based on the server load growth factor increment from the basis,
combines the index of derived throughput rates and the modeled response times with the plurality of production server load metrics to project future throughput rates and future response times, Signed and Sealed this
Twenty-third Day of September, 2014

Michelle K. Lee
*Deputy Director of the United States Patent and Trademark Office*

CERTIFICATE OF CORRECTION (continued)
U.S. Pat. No. 8,606,905 B1 wherein the modeled baseline server load is associated with the baseline production server load metric,
    identifies the at least one production server load metric trend from the combined index, and
creates a work order for at least one of a hardware change or a software change in the production environment based on the identified at least one production server load metric trend.

Claim 5, Col 16, Line 22-24 should read
The system of claim 1, wherein the system determines a plurality of response times for the modeled configuration based on a plurality of server load growth factors.

Claim 6, Col 16, Line 25-26 should read
The system of claim 5, wherein the server load growth factors comprise at least 1% of the modeled baseline server load.

Claim 7, Col 16, Line 28-31 should read
The system of claim 1, wherein server load is expressed as quantity of concurrent user devices maintaining sessions with one of a server in one of the modeled configuration or a production server.

Claim 9, Col 16, Line 37-49 should read
receiving, by a modeling server, a production configuration to simulate a production environment of an enterprise application to identify at least one production server load metric trend, wherein the at least one production server load metric trend indicates at least one of a slower than expected throughput rate, a leveling of throughput levels associated with increasing server loads, a declining of throughput levels associated with increasing server loads, a leveling of response times associated with increasing server loads, or a declining of response times associated with increasing server loads;
combining, by the modeling server, indices of derived throughput rates and corresponding sets of modeled response times from the simulated production environment of the enterprise application with baseline production server load metrics to project future throughput rates and future response times associated with the baseline production server load metrics and production server load metrics based on a plurality of server load growth factors associated with the production configuration;
generating, by the modeling server, a first growth scenario based on a first server load growth factor and generating a second growth scenario based on a second server load growth factor, wherein the first load growth factor is greater than the second load growth factor;

Claim 9, Col 16, Line 50-64 should read
projecting, by the modeling server, at least one of a first throughput rate at the end of a predetermined time period for the first growth scenario or a first response time at the end of the predetermined time period for the first growth scenario;
projecting, by the modeling server, at least one of a second throughput rate at the end of the predetermined time period for the second growth scenario or a second response time at the end of the predetermined time period of the second growth scenario;
determining, by the modeling server, that at least one of the first throughput rate or the first response time is less than a minimum;

CERTIFICATE OF CORRECTION (continued)
U.S. Pat. No. 8,606,905 B1 determining, by the modeling server, that both the second throughput rate and the second response time meets or exceeds the minimum;

identifying, by the modeling server, at least one production server load metric trend associated with first growth scenario based on determining that at least one of the first throughput rate or the first response time is less than the minimum; and allocating, by the modeling server, a work order for increased processing capacity in the production configuration based on identifying the at least one production server load metric trend associated with the first growth scenario.

Claim 11, Col 17, Line 3 should read
The method of claim 10, wherein the predetermined time period is one of one month, three months, or six months.

Claim 15, Col 17, Line 18 should read
generating, by the modeling server, a third growth scenario based on a third server load growth factor wherein the third load growth factor is greater than the first load growth factor;

projecting, by the modeling server, a third throughput rate for the third growth scenario at the end of the predetermined time period determining that the third throughput rate is less than the first throughput rate; and Claim 15, Col 17, Line 25-29 should read
allocating, by the modeling server, a work order for at least one of increased memory capacity or increased input/output capacity in the first server configuration based on the probability of the occurrence of the third growth scenario.

Claim 16, Col 17/Col 18, Line 32-7 should read
accessing, by a modeling server, an analytical model that models response time performance and throughput rates of a plurality of modeled server configurations under a plurality of processing load scenarios;

generating, by the modeling server, a first plurality of modeled response times and a first plurality of modeled throughput rates from the analytical model based on a first modeled server configuration under a first processing load scenario;

generating, by the modeling server, a second plurality of modeled response times and a second plurality of modeled throughput rates from the analytical model based on a second modeled server configuration under the first processing load scenario;

identifying, by the modeling server, at least one production server load metric trend based on at least one of the first plurality of model response times, the first plurality of modeled throughput rates, the second plurality of modeled response times, or the second plurality of modeled throughput rates, wherein the at least one production server load metric trend comprises at least one of a slower than expected throughput rate, a leveling of throughput levels associated with increasing server loads, a declining of throughput levels associated with increasing server loads, a leveling of response times associated with increasing server loads, or a declining of response times associated with increasing server loads;

CERTIFICATE OF CORRECTION (continued)
U.S. Pat. No. 8,606,905 B1 analyzing, by the modeling server, the first plurality of modeled response times, the first plurality of throughput rates, the second plurality of modeled response times, and the second plurality of modeled throughput rates to promote a third server model configuration, wherein the third modeled server configuration combines elements of the first modeled server configuration and the second modeled server configuration;

Claim 16, Col 18, Line 8-18 should read generating, by the modeling server, a third plurality of modeled response times and a third plurality of modeled throughput rates from the analytical model based on the third modeled server configuration under the first processing load scenario, wherein the third plurality of modeled response times and the third plurality of modeled throughput rates indicate that the third modeled server configuration promotes improved performance relative to the first modeled server configuration and the second modeled server configuration; and creating, by the modeling server, a work order for a server configuration matching the third modeled server configuration based on a determination that the third plurality of modeled response times and the third plurality of modeled throughput rates indicate that the third modeled server configuration promotes improved performance relative to the first modeled server configuration and the second modeled server configuration.

Claim 17, Col 18, Line 19-21 should read
The method of claim 16, wherein the first processing load is determined to be a representative processing load for an enterprise application.